United States Patent
Steves

[15] 3,659,374
[45] May 2, 1972

[54] INSECT CATCHER ASSEMBLY
[72] Inventor: Leon F. Steves, 1181 Mead Lane, Flagstaff, Ariz. 86001
[22] Filed: Jan. 11, 1971
[21] Appl. No.: 105,362

[52] U.S. Cl. ............................................................. 43/134
[51] Int. Cl. ......................................................... A01m 3/00
[58] Field of Search .................... 43/134, 135, 133, 110, 111

[56] References Cited

UNITED STATES PATENTS

| | | |
|---|---|---|
| 205,464 | 7/1878 | Babcock ................................. 43/110 |
| 1,462,416 | 7/1923 | McDermott ............................ 43/134 |

Primary Examiner—Warner H. Camp
Attorney—Drummond & Phillips

[57] ABSTRACT

A hand-held insect catcher assembly for entrapping and dispatching an insect located upon a surface. The assembly has a box-like trap which is open on the underside and an elongate handle extending rearwardly therefrom. When the assembly is positioned over an insect, and upon striking the surface, a bias loaded slide bar within the trap is triggered and released to travel rearwardly to dispatch the insect and deposit same into the hollow handle. An end cap on the handle facilitates removal of the collected insects.

3 Claims, 8 Drawing Figures

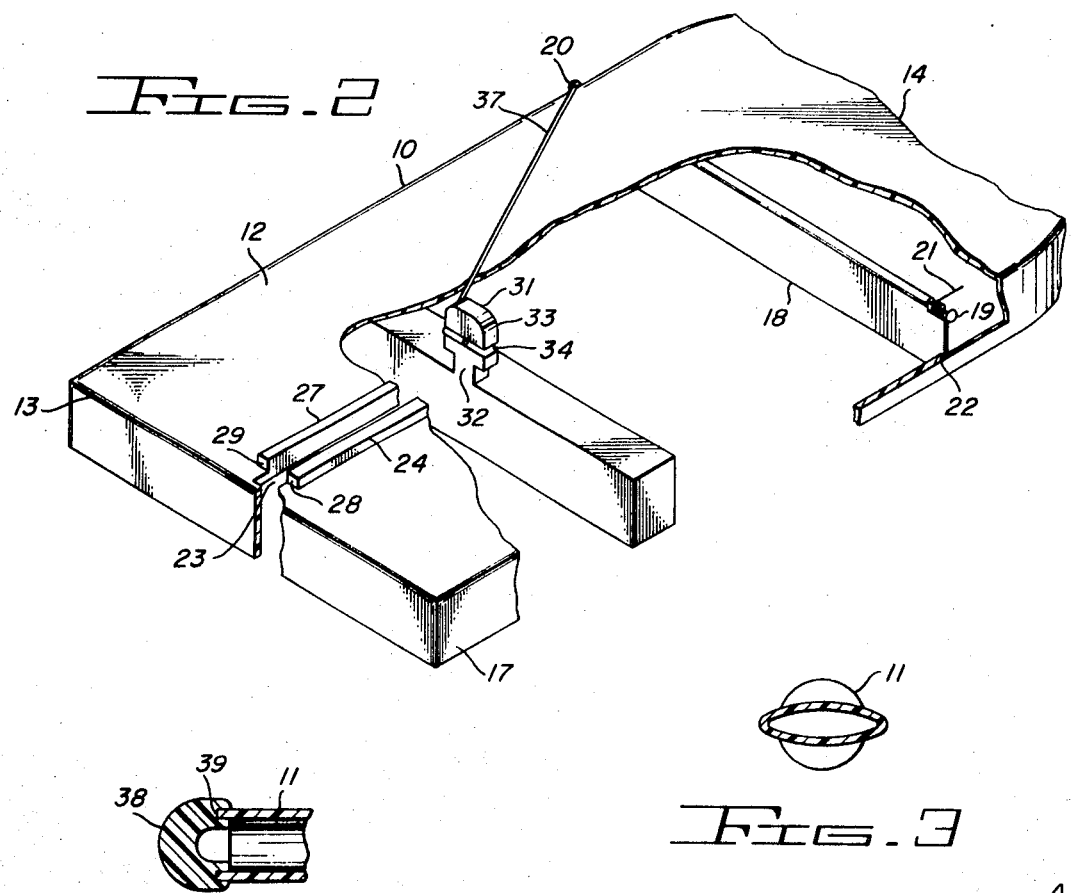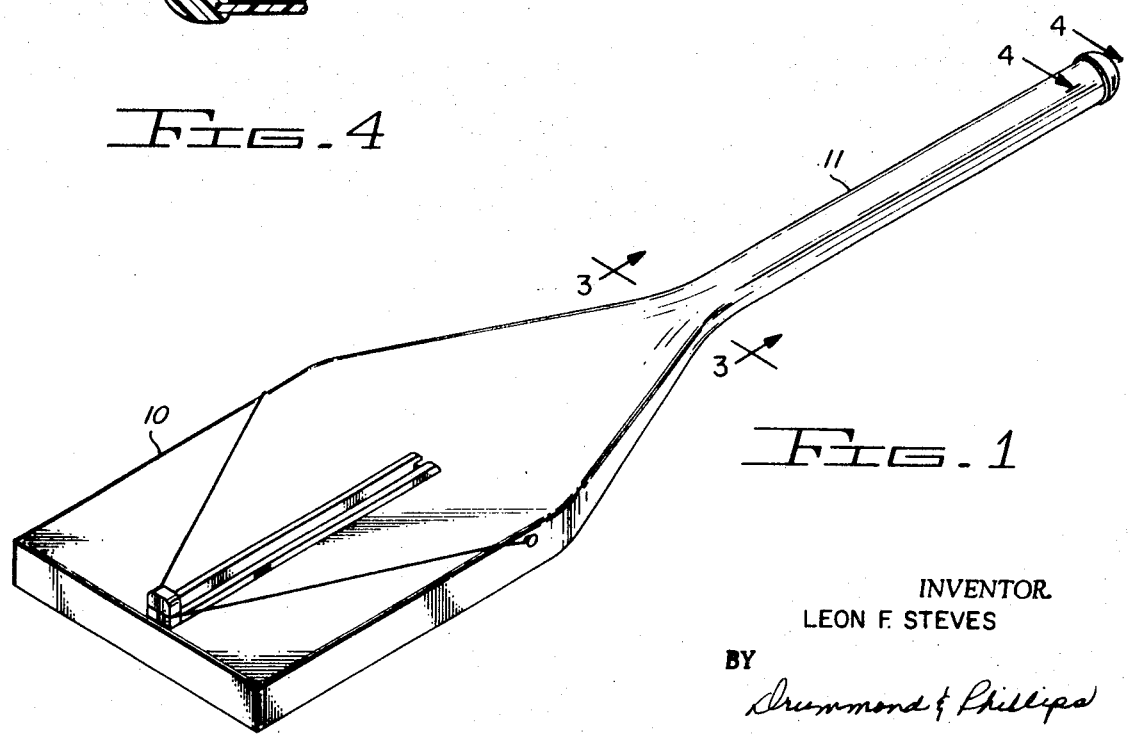

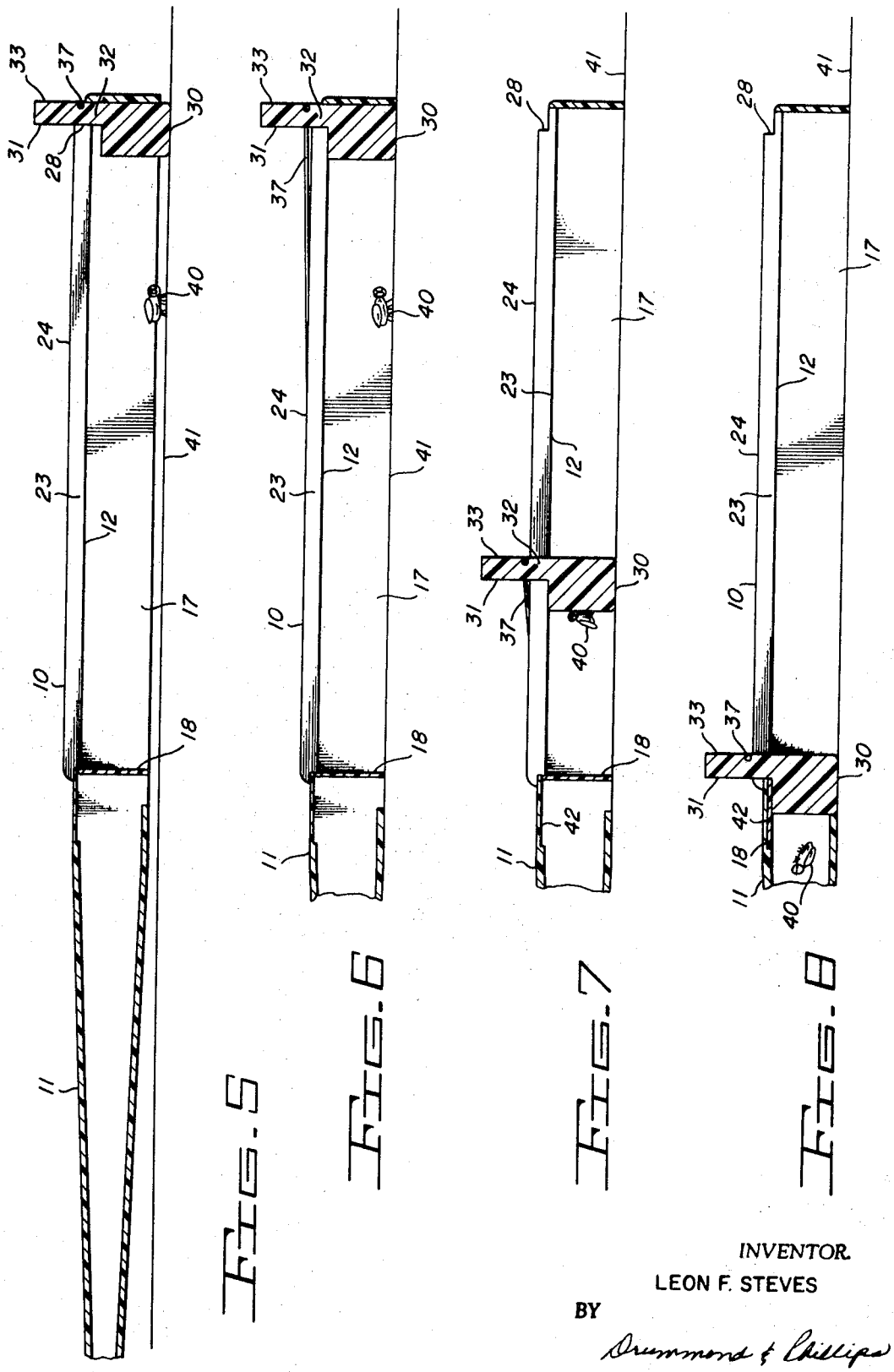

INSECT CATCHER ASSEMBLY

The present invention relates to devices for catching insects.

In a further aspect, the invention relates to a hand-held insect catcher assembly adapted to entrap an insect located upon a surface and further adapted to dispatch the insect without rupturing the insect body.

In a still further aspect, the invention concerns a hand-held insect catcher of the above type wherein the insects so dispatched are automatically deposited in a receptacle and retained for disposition at the user's convenience.

The prior art is replete with insect catchers, traps and exterminators. These devices range from the simple universal flyswatter, and adhesive coated insect attracting strips, through such sophisticated devices as aerosal exterminating sprays and "bug lights." The utility of these devices cannot be denied. Each is singularly useful within its designed intent. The common flyswatter excells at dispatching insects, however, it generally ruptures the insect and leaves it squashed upon the surface where it was resting. Aerosol sprays are effective but cannot be used, due to their toxic residue, to any extent around food preparation or in closed quarters. Adhesive strips in addition to being unsightly, have been of concern in recent times due to their toxicity. Further such strips dispatch only those insects which they attract and promote physical contact. Bug lights are generally only effective in the darkened hours and litter the area below with the bodies of dead insects.

The art would be significantly advanced by the provision of a device having the simple effectiveness of a flyswatter for dispatching singular insects resting upon a surface without, however, rupturing the insect or leaving the insect squashed upon the surface. Such a device, if incorporating features to deposit the dispatched insect within a container where they may be retained for future disposal, would have particular appeal in food service areas especially in connection with disposing of insects resting upon the dining table or food preparation areas. The waitress or cook could then dispatch insects in a somewhat unobtrusive manner. In the home, it would alleviate the necessity of retrieving and disposing the insect manually thereby eliminating the necessity of washing one's hands after disposing of each insect.

Accordingly, it is a principal object of the present invention to provide a hand-held insect catcher assembly to entrap and dispatch an insect located upon a surface.

A further object of the invention is the provision of an insect catcher assembly which will dispatch the insect without rupturing the insect body or leaving an intestinal residue upon the surface.

Still another object of the invention is to provide a hand-held insect catcher assembly which will accumulate the dispatched insects for disposal at the user's convenience and eliminate manual contact with the dispatched insects.

Yet another and further object of the invention is to provide a hand-held insect catcher assembly of the above type which may be readily and conveniently employed in an unobtrusive manner.

These and other, further and more specific objects and advantages of the present invention will become apparent to those skilled in the art from the following detailed description of the invention, taken in conjunction with the drawings, in which:

FIG. 1 is a perspective view of a hand-held insect catcher assembly of the present invention chosen for purposes of illustrating a presently preferred embodiment thereof;

FIG. 2 is an enlarged isometric view, partly in section, specifically illustrating the entrapping portion of the device of FIG. 1;

FIG. 3 is a sectional view, taken along the line 3—3 of FIG. 1;

FIG. 4 is an elevation view, in section, taken along the line 4—4 of FIG. 1, and detailing the removable handle end cap thereof;

FIG. 5 is a semi-schematic view of a cross section of that portion of the device shown in FIG. 2 specifically showing the device at the initial phase of operation;

FIG. 6 is a view corresponding to FIG. 5 at an instantaneously subsequent phase of operation;

FIG. 7 is a view corresponding to FIG. 6 at a subsequently later phase of operation; and FIG. 8 is a view corresponding to FIG. 7 at the terminal phase of operation.

Briefly, to achieve the desired objectives of my present invention, in accordance with the preferred embodiment thereof, I first provide a box-like trap having a substantially horizontal top panel, a pair of spaced parallel side panels and a rear panel extending between the side panels. A bar, substantially parallel to the rear panel is slideably disposed for forward and rearward movement between the side panels. Suitable biasing means, as for example an elastic band, is provided to slide the bar into contact with the rear panel while detent means normally retain the bar at the forward portion of the box-like structure. An elongate hollow handle is connected to and extends rearwardly from the structure.

The rear panel is hinged at its intersection with the top panel. A second biasing means urges the rear panel forward against a stop which normally maintains the panel in a vertical position.

In operation, the insect catcher assembly is manipulated in a manner analogous to the common flyswatter. Holding the assembly by the handle, the user brings the box-like trap portion down over an insect resting upon a surface and entrapping the insect therein. The detent means, responsive to striking the assembly against the surface, releases the bar which immediately is pulled to the rear by the elastic band. During the rearward movement, the bar encounters the insect an propels it rearwardly until the insect is lightly pressed between the rear panel and the bar. As the bar continues to move to its final rearward position, it pivots the rear panel upwardly and ejects the insect into the hollow handle. It is obvious that the employment of a relatively light second biasing means, such as a small torsion spring, will permit the rear panel to displace after being struck by the insect, as propelled by the bar, with only sufficient force to stun or kill the insect without rupturing the insect's body. After a sufficient quantity of insects have been collected within the handle, and at the user's convenience, the end cap on the handle may be removed to release the collected insects into a suitable disposition container.

Turning now to the drawings, in which the same reference numerals indicate corresponding elements throughout the various views, FIG. 1 illustrates a presently preferred embodiment of the insect catcher assembly of the present invention chosen for purposes of illustration and shows the box-like trap portion 10 having a hollow handle 11 extending rearwardly therefrom. In this view, the insect catcher assembly is in the ready position to entrap an insect as will be hereinafter described in greater detail.

FIG. 2 specifically details the box-like trap assembly 10 having a substantially horizontal top panel 12 having a forward end 13 and a rearward end 14. A pair of spaced parallel side panels 17 and 17a, 17a not specifically shown however analogous to panel 17, depend from the top panel and extend longitudinally thereof. A rear panel 18 extends between the side panels 17 and 18 and is pivotally secured thereto near the top panel 12 by hinge pins 19 and 20 which pass through the side panels and are secured into the upper edge of the rear panel 18. A torsion spring 21, encircling the hinge pin 19, bears against the under surface of the top panel 12 and against the rear panel 18 to urge the panel 18 in a forward direction. A shoulder 22, integral with the side panel 17, provides a stop means to retain the rear panel in a normally vertical position.

A slot 23 extends the length of the top panel 12. Guide rails 24 and 27 having ends 28 and 29 respectively, are disposed upon the top panel 12 along either side of the slot 23 such that the ends 28 and 29 terminate rearward of the forward end of the slot 23.

A bar 30, having approximately the same vertical height as the side panel 17 and substantially parallel to the rear panel 18, is slideably disposed for forward and rearward movement between the side panels. An upright projection 31 upstanding from the bar 30 has a first narrowed section 32 which is slideable within the slot 23 and between the guide rails 24 and 27, and a second enlarged portion 33 slideable over the guide rails 24 and 27 and having a width to substantially span the rails. A groove 34 within the upright projection 31 retains an elastic band 37 which is secured at one end to the hinge pin 20 and at the other end to the hinge pin 19.

Fig. 3 is a cross section of the hollow handle 11 near the forward end thereof. It is particularly noted in this view that while the handle 11 is cylindrical at the grip portion it tapers to a substantially thin wide cross section at this portion to provide resiliency between the grip and the box-like entrapping section. FIG. 4 shows the end cap 38 having an annular recess 39 which frictionally engages the end of the handle 11, and is detachable therefrom to facilitate removal of the insects collected within the hollow handle.

FIG. 5 shows the insect catcher assembly at the initial phase of operation. The bar 30 is retained in the forward position, having been manually set by sliding the bar 30 forwardly until the enlarged portion 33 of the upright 31 is forward of the forward ends 28 and 29 and the rails 24 and 27 respectively, and then urged downwardly until the enlarged portion 33 abuts the ends 28 and 29. The elastic band 37 urges the bar 30 rearwardly to frictionally maintain the enlarged portion 33 against the ends 28 and 29 of the rails 24 and 27. This interaction provides a detent means to releasably retain the bar in the forward position spaced from the rear panel 18. In this view the insect catcher assembly has been manually employed in a manner analogous to the common flyswatter to entrap the insect 40 resting upon the surface 41.

As shown in FIG. 6, the striking action of the bar 30 against the surface 41 has urged the bar upwardly until the enlarged portion 33 of the upright 31 has cleared the ends 28 and 29 of the rails 24 and 27 respectively. The narrowed section 32 is now free to slide between the rails 24 and 27 and within the slot 23 as the bar 30 is pulled rearwardly by the elastic band 37. The insect 40 is completely enclosed, having no escape route.

FIG. 7 shows the bar 30 having substantially advanced in its rearward travel as urged by the elastic band 37. The insect 40 is shown upon the side of the bar 30 having risen immediately upon entrapment in accordance with its natural instinct. However, the function of the insect catcher assembly of the present invention is not dependent upon the natural rising instinct of the insect. FIG. 8 shows the terminal rearward movement of the bar 30. After abutting the insect 40 against the rear panel 18, the bar 30 continues its rearward direction with sufficient force to overcome the torsion spring 21 and pivot the rear panel 18 about its hinge pins 19 and 20 into a recess 42 and deposit the insect within the hollow handle 11.

Tilting the forward end of the assembly upward slightly will permit the insect to drop to the rearward portion of the handle along with other insects so collected, for disposal at the user's convenience. To prepare for the entrapment and dispatch of a subsequent insect, the bar 30 is reset, as hereinbefore described, by urging the upright 31 forward then downward to engage the enlarged portion 33 ahead of the ends 28 and 29 of the rails 24 and 27. It is obvious that the insect is not ruptured by the relatively light abutment against the rear panel 18. It is also obvious that the insect catcher assembly of the present invention requires minimal manual dexterity to operate and may be safely employed in those areas prohibiting the use of toxic insect sprays. Further, the user need never soil his hands in the disposal of insects as is particularly the case in those squashed by the common flyswatter.

Having fully described and disclosed the invention in what I conceive to be the presently preferred embodiment thereof, in such a manner as to enable those skilled in the art to understand and practice the same, I claim:

1. A hand-held insect catcher assembly adapted to entrap an insect located upon a surface and further adapted to dispatch said insect without rupturing said insect, said insect catcher assembly comprising:
   a. a substantially horizontal top panel having a front end and a rearward end;
   b. a pair of spaced parallel side panels depending from said top panel and extending longitudinally thereof;
   c. a rear panel depending from said top panel and extending between said side panels;
   d. a bar substantially parallel to said rear panel, slideably disposed for forward and rearward movement between said side panels;
   e. biasing means to normally urge said bar toward said rear panel;
   f. detent means, responsive to striking said assembly against said surface and operatively associated with said biasing means to releasably retain said bar spaced from said rear panel until said assembly is triggered by striking against said surface; and
   g. an elongate handle connected to and extending rearwardly from said assembly.

2. The insect catcher assembly of claim 1, wherein said rear panel includes;
   a. hinge means proximate the intersection of said rear panel and said top panel to permit said rear panel to move angularly relative said top panel;
   b. second biasing means to pivotally urge the lower end of said rear panel toward the forward end of said assembly; and
   c. stop means, opposing said second biasing means, to retain said rear panel in a normally vertical position.

3. The insect catcher assembly of claim 2, in combination with a dispatched insect holding receptacle rearward of said rear panel,
   wherein said bar pivotally operates said rear panel to deposit said dispatched insect within said receptacle.

* * * * *